United States Patent [19]

Egan

[11] Patent Number: 4,756,502

[45] Date of Patent: Jul. 12, 1988

[54] AIRCRAFT SEAT

[75] Inventor: William H. Egan, Springdale, Ark.

[73] Assignee: Nordam, Tulsa, Okla.

[21] Appl. No.: 878,789

[22] Filed: Jun. 26, 1986

[51] Int. Cl.⁴ .............................................. A47C 3/18
[52] U.S. Cl. .................................... 248/425; 297/344; 297/349
[58] Field of Search ............... 248/424, 425, 418, 655, 248/662; 297/349, 344, 337; 92/38; 60/594; 70/DIG. 48

[56] References Cited

U.S. PATENT DOCUMENTS

| | | | |
|---|---|---|---|
| 1,827,627 | 10/1931 | Travis | 248/416 |
| 1,902,282 | 3/1933 | Hulfgren | 248/425 |
| 3,292,917 | 12/1966 | Sherburne | 267/162 |
| 3,423,937 | 1/1969 | Wagstaffe | 92/38 X |
| 4,588,226 | 5/1986 | Young et al. | 248/425 X |
| 4,671,572 | 6/1987 | Young et al. | 248/425 X |

FOREIGN PATENT DOCUMENTS 463559  5/1975  U.S.S.R. ................ 297/349

Primary Examiner—J. Franklin Foss
Assistant Examiner—David L. Talbott
Attorney, Agent, or Firm—Head & Johnson

[57] ABSTRACT

An aircraft seat formed of a container having a horizontal top surface and opposed paralleled downwardly extending sides, a seat base supported parallel to and above the container top surface, an aircraft seat being supported on the seat base, a plurality of low friction pads interposed between the container top surface and the seat base to permit the seat base to be easily moved relative to the container, the seat base and the container top having aligned openings therethrough, a shaft received in the openings and rigidly connected to a brake plate positioned below the container top, a spring urging the brake plate upwardly to lock the seat base relative to the container and an actuating member affixed to the seat base and extending over the shaft providing a mechanism for downward displacement of the shaft to thereby release the force of the brake plate to thereby allow the seat base to be moved and/or rotated relative to the container.

14 Claims, 10 Drawing Sheets

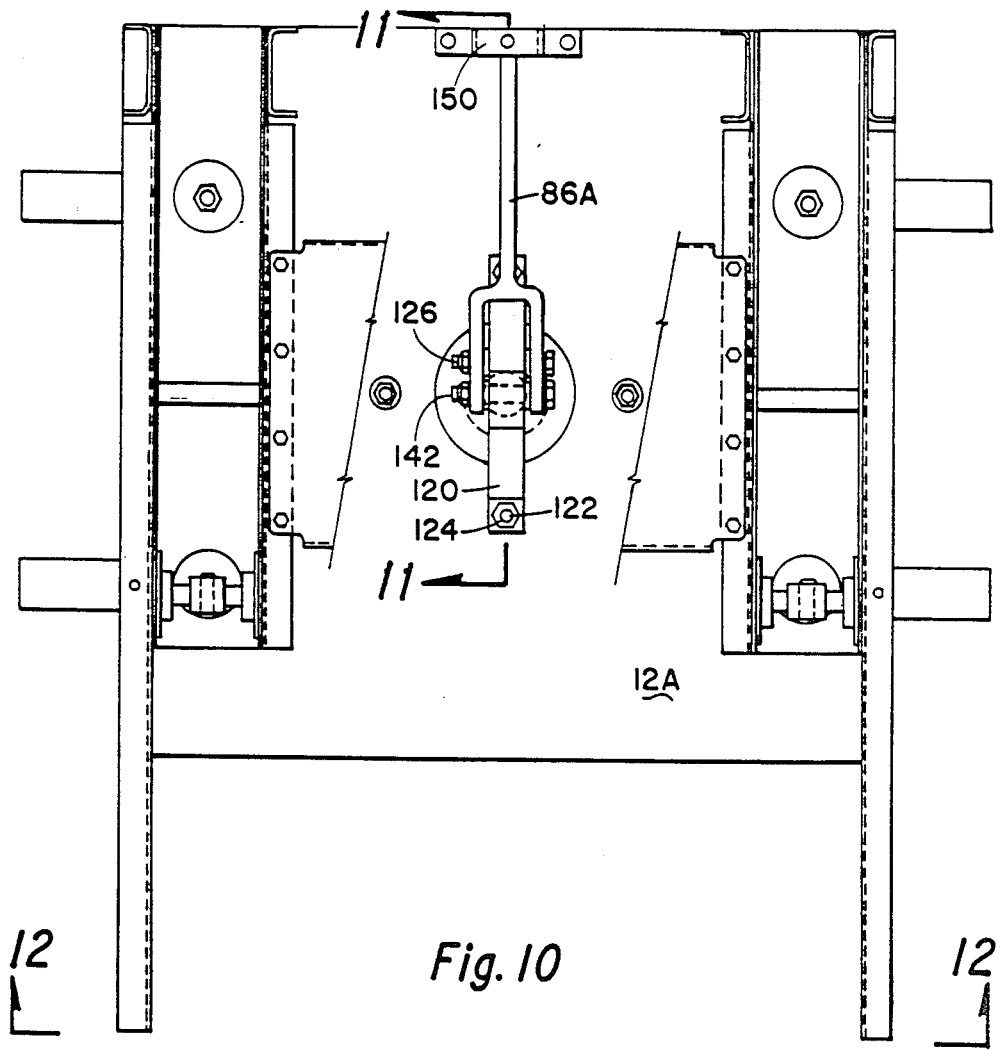
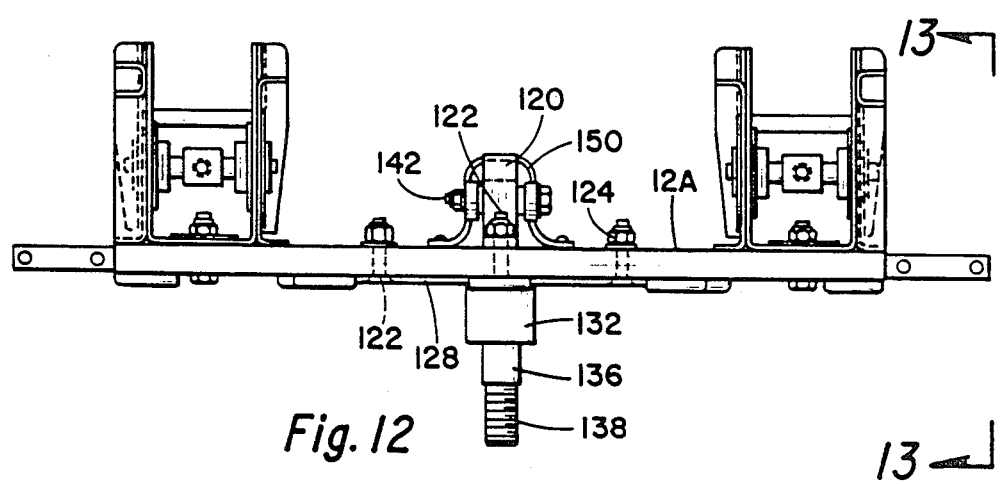
Fig. 10
Fig. 12

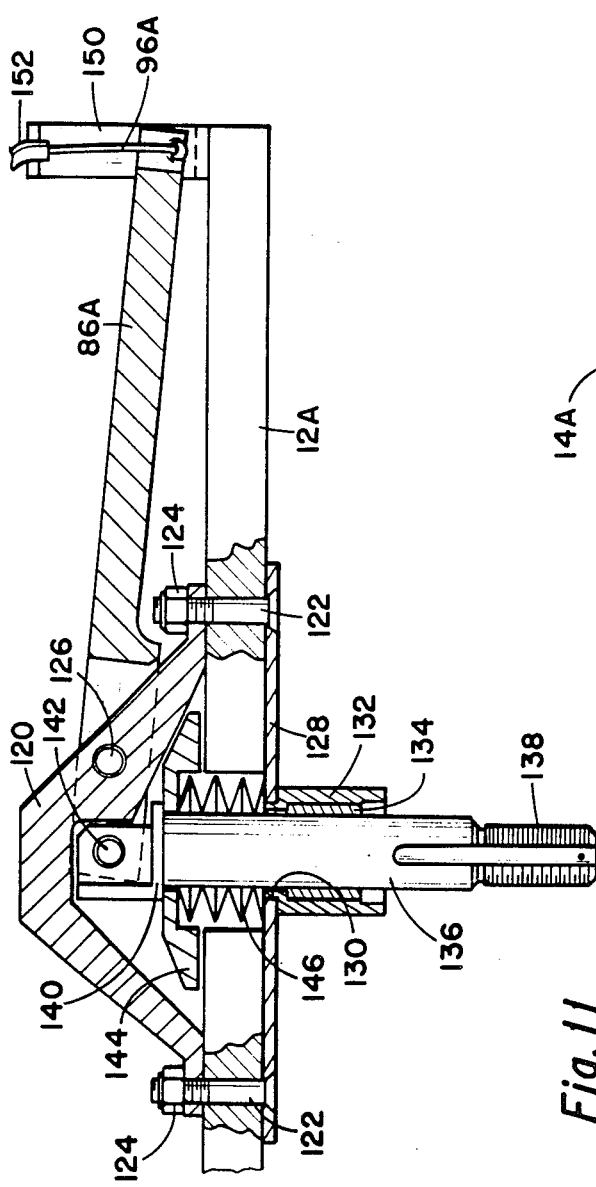
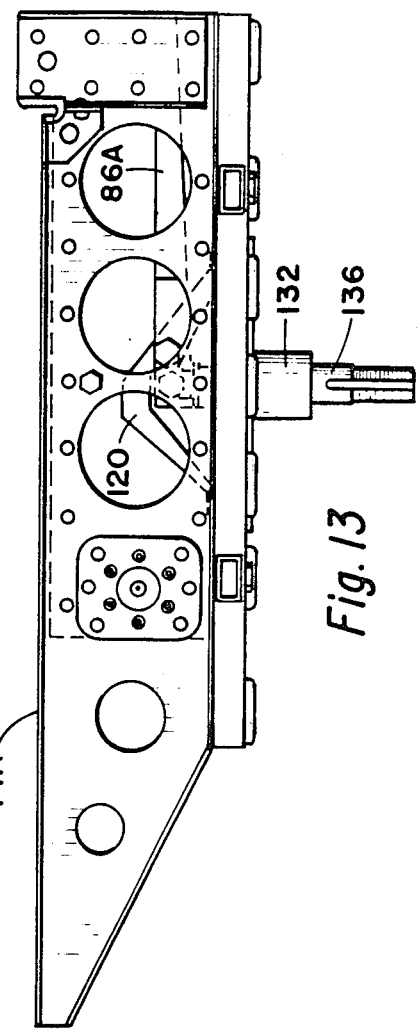
Fig. 11
Fig. 13

4,756,502

AIRCRAFT SEAT

SUMMARY OF THE INVENTION

Seats of the type used in aircraft must meet demanding standards. Not only are the seats required to withstand forces of several times gravitational force but they must be readily adjustable fore and aft, as well as laterally and rotationally to provide the seating required for maximum comfort and efficiency.

The aircraft seat of the present invention satisfies all of these requirements and specifically, provides a seat which can be readily adjusted forwards and backwards, to the right or left, and rotationally, all with the actuation of one release mechanism. The seat includes and is supported on a container which has a generally horizontal top with an upper and a lower surface. The container has opposed paralleled sides which extend perpendicular to the container top. A seat base is supported parallel to and above the container top upper surface. A plurality of low friction pads are affixed to the bottom surface of the seat base to engage the container top surface to thereby allow the seat base to be easily slid on the container top.

A generally horizontal slider plate is positioned within the container and in contact with the bottom of the container top surface, the slider plate has rollers secured at its opposed parallel edges, the rollers engaging the interior sides of the container.

In one embodiment of the invention there is positioned above the seat base a spider plate. A plurality of springs are compressibly positioned between the lower surface of the spider plate and the seat base so that the spider plate is urged upwardly relative to the seat base. In a second embodiment the spider plate is not used.

Positioned below the slider plate is a brake plate. The top surface of the brake plate frictionally engages the bottom surface of the slider plate. An opening is provided in the slider plate, the brake plate, the container top, the seat base and the spider plate which receives a shaft, the shaft locking together the spider plate and the brake plate. The springs which upwardly urge the spider plate thereby upwardly urge the brake plate against the lower surface of the slider plate and thereby the slider plate into engagement with the lower surface of the container to lock the position of the seat base relative to the container.

In a second embodiment a spider plate is not employed and instead an inverted V-shaped bracket is affixed to the top of the seat base. Below the bracket the shaft downwardly extends to attach to the brake plate. A stack of Belleville or conically shaped washers serve as a spring to urge the shaft upwardly.

When the shaft is downwardly depressed the tension is relieved on the brake plate, allowing the seat base to be moved forward and aft or laterally relative to the container top surface and also allowing the seat base to be rotated relative to the container top surface.

The shaft with the brake plate affixed thereto may be downwardly depressed by means of a lever having one end pivotally supported to the seat base and extending over the shaft. The other end of the lever may be directly manually moved or it may be connected by a cable extending to an actuating lever, permitting the actuating lever to be remotely located.

Another means of depressing the shaft when it is necessary to change the position of the seat includes the use of a hydraulic cylinder mounted on a bracket extending above the shaft. The hydraulic cylinder has a piston rod which engages the spider plate. A remotely located actuating cylinder is provided which also has an extending piston rod. By means of a lever which is affixed to the actuating cylinder piston rod, hydraulic force may be applied from the actuating cylinder, through a hydraulic hose, to the hydraulic cylinder to force the extension of the piston rod therefrom to downwardly depress the shaft. By either the mechanical means or the hydraulic means the downward depression of the shaft permits the ready adjustment of the seat base.

A better understanding of the invention will be had by reference to the following description and claims, taken in conjunction with the attached drawings.

DESCRIPTION OF THE DRAWINGS

FIG. 7 is a horizontal view taken along the line 7—7 of FIG. 6 showing more details of the alternate seat embodiment.

FIG. 10 is a partial plan view as in FIG. 7 but with a plate removed to reveal more details of the actuating mechanism.

FIG. 11 is an elevational cross-section of the seat actuating mechanism as taken along the line 11—11 of FIG. 10.

FIG. 12 is a partial elevational cross-sectional view taken along the line 12—12 of FIG. 10 showing additional details of the seat actuating mechanism.

FIG. 13 is an elevational view of a portion of the seat as taken along the line 13—13 of FIG. 12.

DETAILED DESCRIPTION

Figure 1:
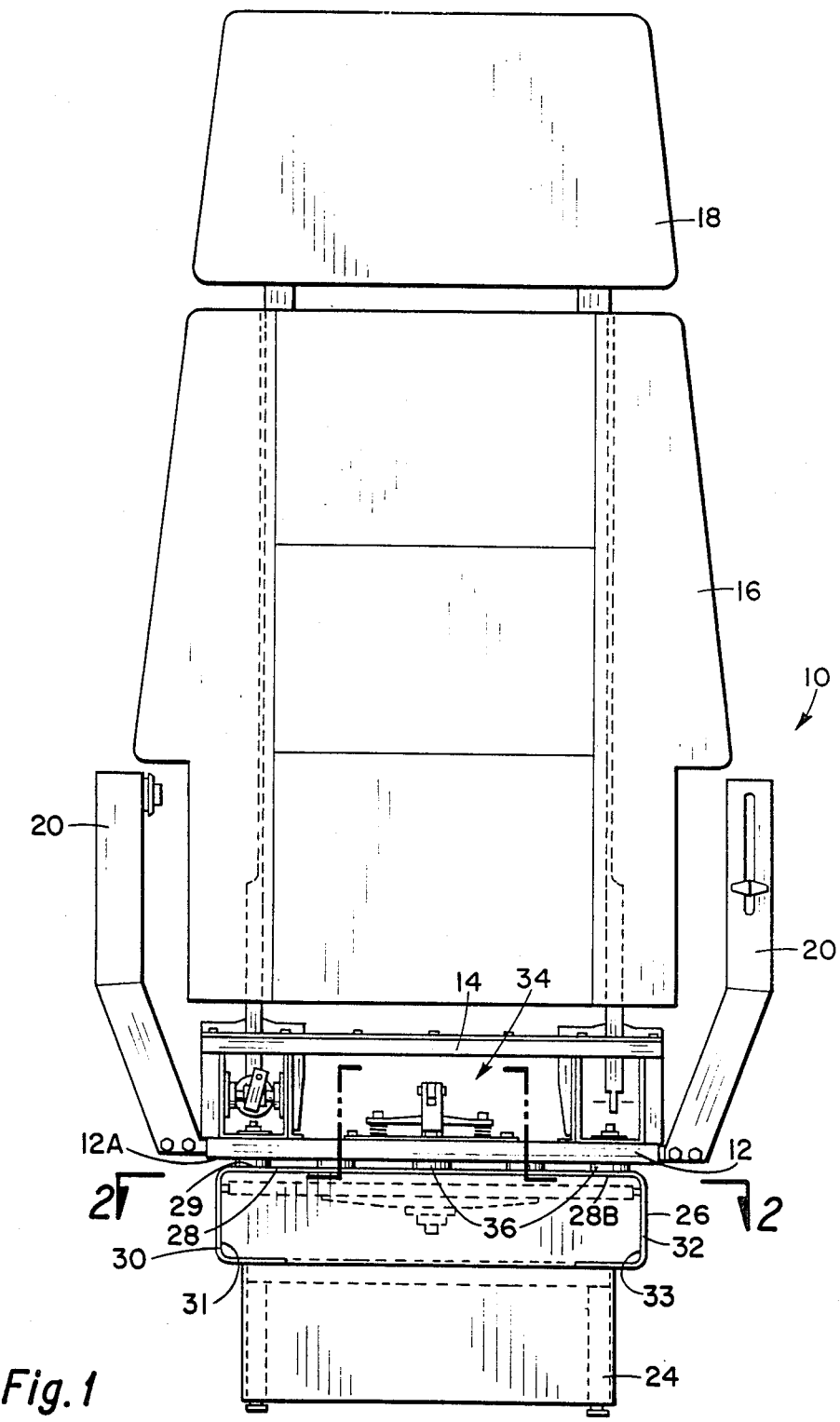
FIG. 1 is a front elevational view of an aircraft seat of this invention, the seat cushion not being shown.

Referring to the drawings and first to FIG. 1 an exemplified embodiment of the invention is illustrated. An aircraft seat employing the principles of this invention is generally indicated by the numeral 10. A seat base 12 supports the seat which includes a seat diaphragm 14 on which a seat cushion (not shown) may be placed, a seat back 16, having a head rest 18, and arm rests 20. The particular configuration of the elements 14 through 20 is not a part of this invention; instead, the invention is concerned with the means of positioning the seat base 12 so as to provide comfortable positioning of the seat for an aircraft crew member.

The seat 10 is supported on a pedestal 24 which is secured to the aircraft superstructure (not shown). Mounted on the pedestal 24 is a container 26. The container has a top 28 having an upper surface 29 and a lower surface 28B. The container also has opposed parallel downwardly extending sidewalls 30 and 32. The sidewalls have inner surfaces 31 and 33, respectively. The seat base 12 is retained in position relative to the container top 28 by means of an actuator assembly generally indicated by the numeral 34. Postioned between the lower surface 13 of the seat base and the container top upper surface 29 are a plurality of low friction pads 36, such as formed of Teflon.

Figure 2:
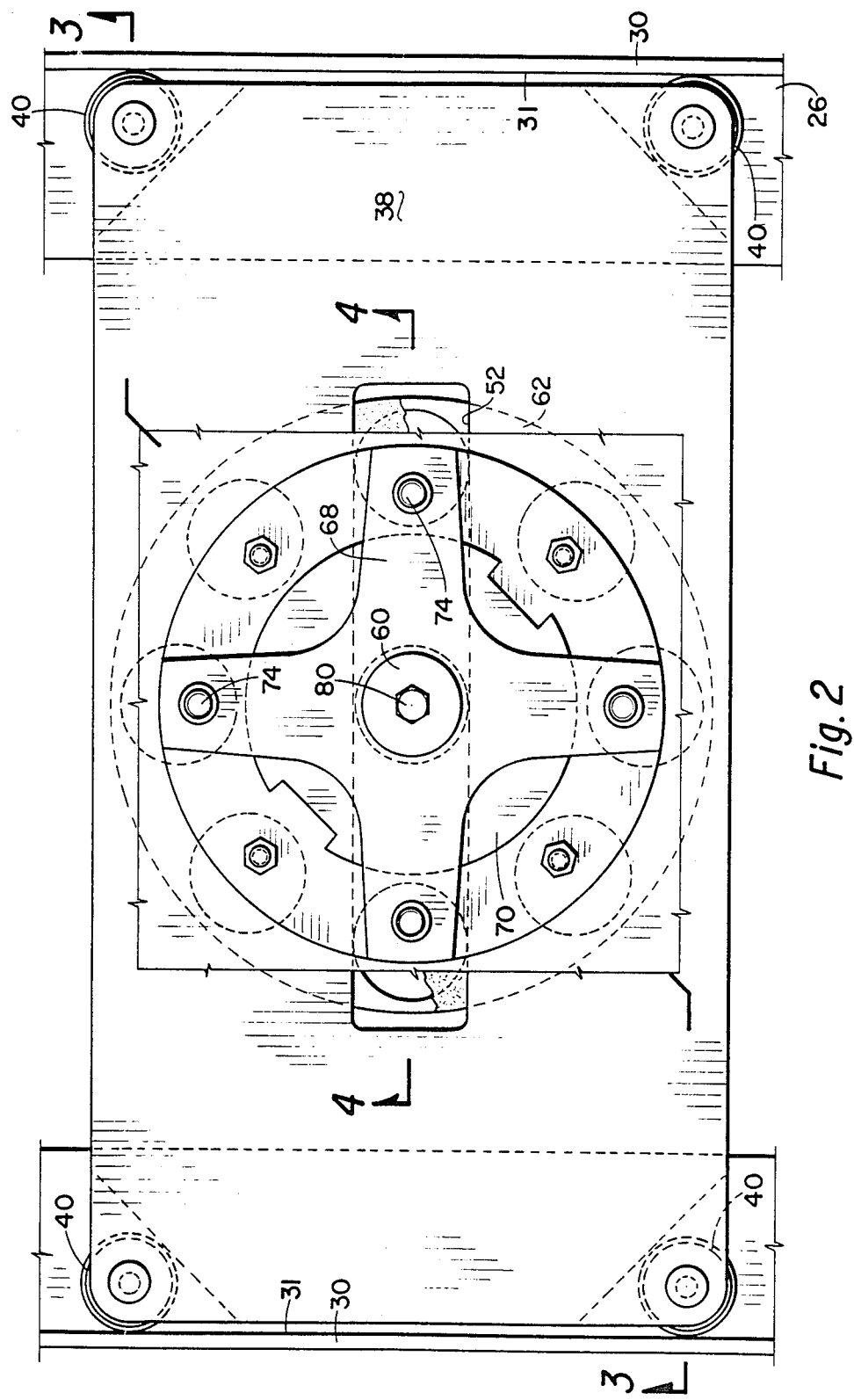
FIG. 2 is a cross-sectional view taken along the line 2—2 of FIG. 1.
Figure 3:
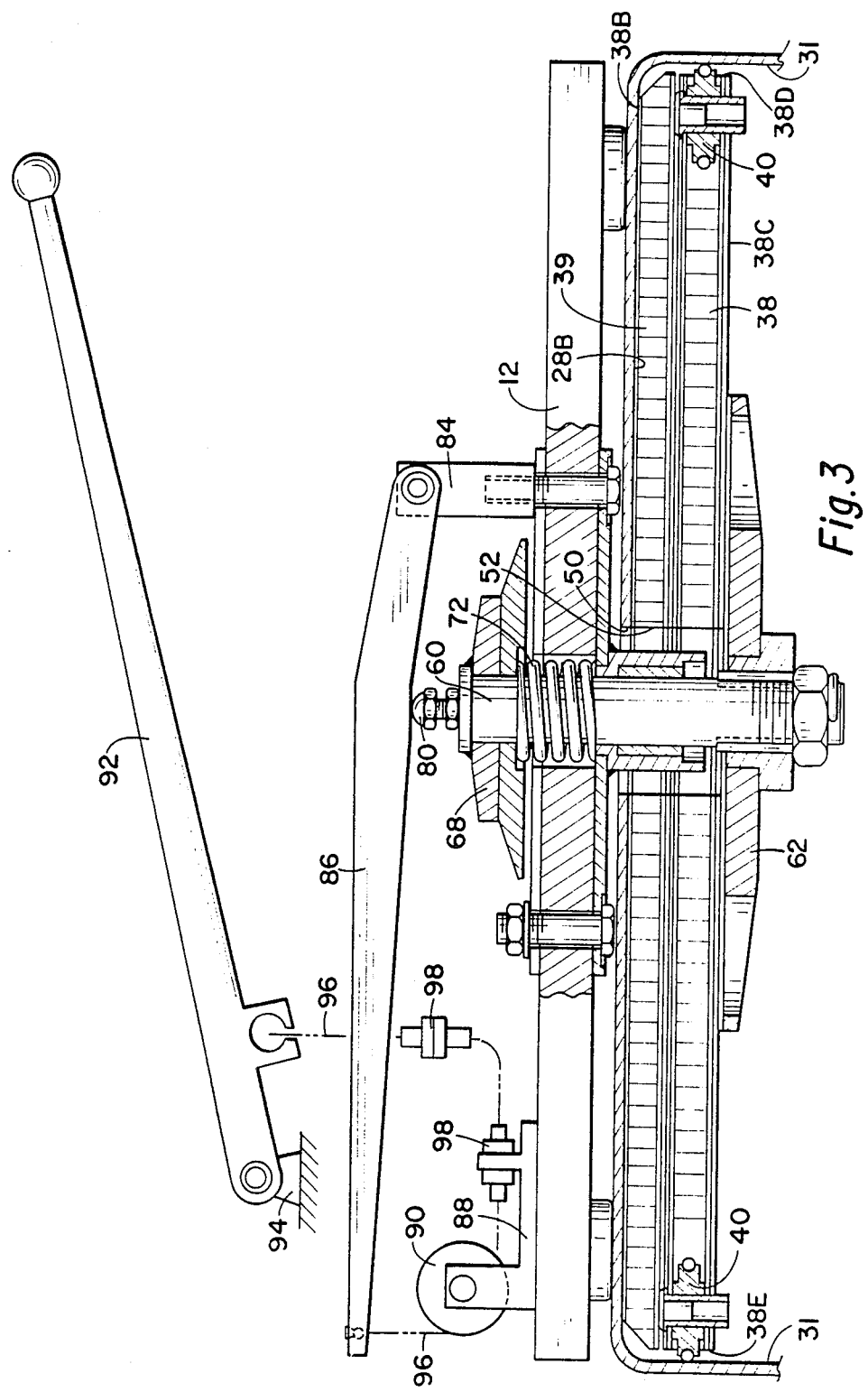
FIG. 3 is a vertical cross-sectional view taken along the line 3—3 of FIG. 2 showing a mechanical seat adjustment mechanism.
Figure 4:
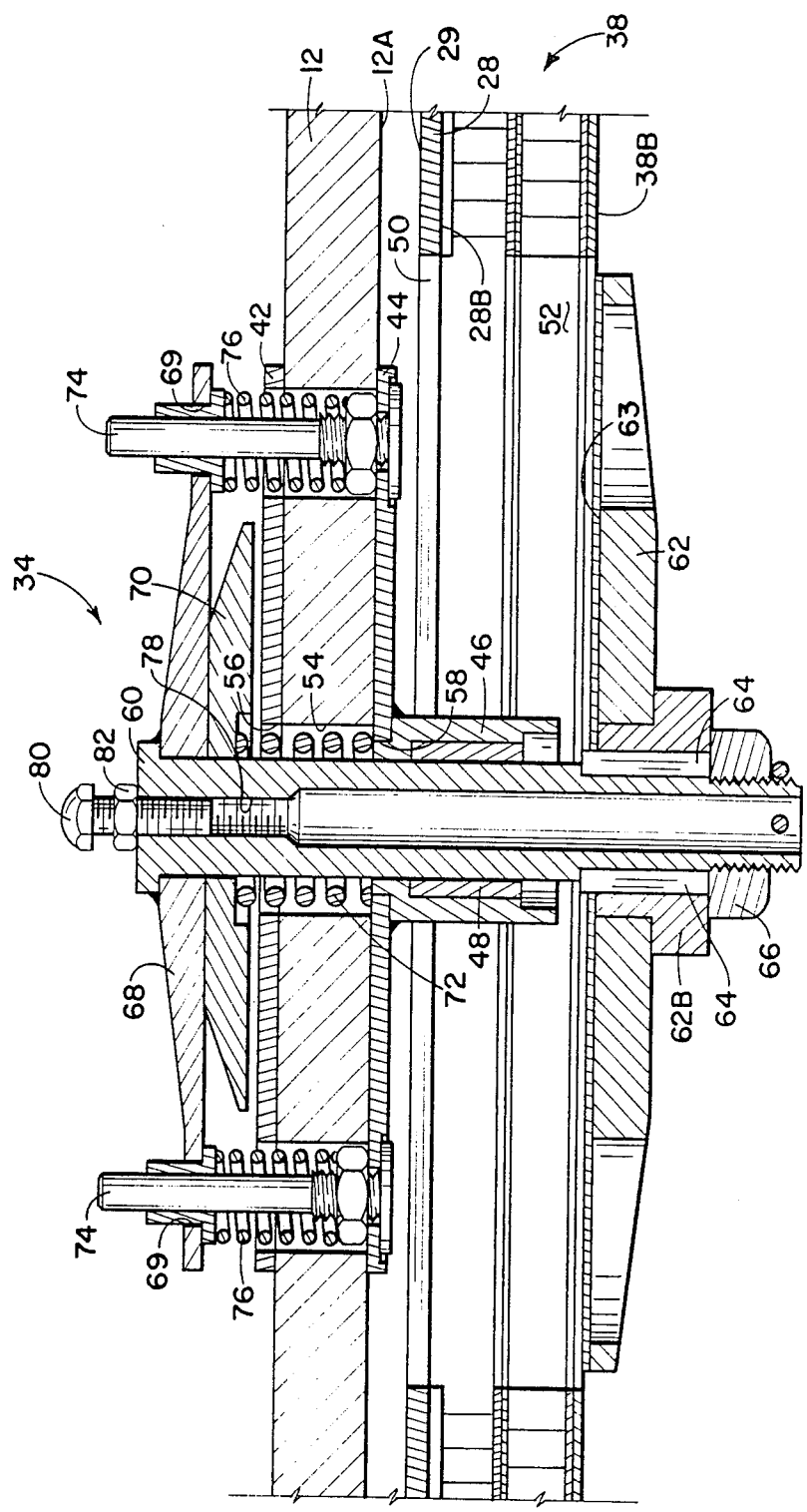
FIG. 4 is another vertical cross-sectional view taken along the line 4—4 of FIG. 2.

Referring to FIGS. 2, 3 and 4 the details of the anchor assembly 34 are best illustrated. Positioned within container 26 is a slider plate 38. In the preferred arrangement as illustrated the slider plate 38 is formed of honeycomb panel, that is, it has a relatively thin top and bottom surface with light-weight honeycomb material bonded to it. The slider plate 38 includes two members in parallel relationship, the upper portion of the slider plate 38 being indicated by the number 39. The slider plate upper surface 38B engages the container top lower surface 28B. The slider plate has a lower surface 38C. Secured to the opposed parallel edges 38D and 38E are rollers 40 which engage the container sidewall inner surfaces 31.

A top reinforcing plate 42 is secured to the top surface of seat base 12 and a bottom reinforcing plate 44 is secured to the bottom surface 12C. Affixed to the bottom reinforcing plate 44 is a hub 46 having a bushing 48 therein.

The container top 28 has an opening 50 in it. The slider plate 38 has an opening 52. Seat base 12 has an opening 54. Top reinforcing plate 42 has opening 56 and bottom reinforcing plate 44 has an opening 58. These openings receive a shaft 60.

Affixed to shaft 60 at its lower end is a brake plate 62, the upper surface 63 of which engages the slider plate lower surface 38B. By means of keys 64 received in slots formed in the exterior surface of shaft 60 and in the hub portion 62B of the brake plate, the shaft is rotatably locked to the brake plate. The lower end of shaft 30 is threaded and receives a nut 66 by which the brake plate is secured to the shaft.

Postioned above the seat base 12 is a spider plate 68. The spider plate has an opening in it and is attached, such as by welding, to the upper end of shaft 60. Beneath the spider plate and received about shaft 60 is a spacer support disc 70. A compression spring 72 extends between the seat base 12, that is between the bottom reinforcing plate 44 and the spacer support disc 70.

Secured to the bottom reinforcing plate 69 are guide pins 74, each of which extends through an opening 68A in the spider plate. Compression springs 76 are received on the guide pins 74 and apply upward pressure on the spider plate. It can be seen that the springs 72 and 76 force the spider plate 68 and thereby shaft 60 upwardly relative to the seat base 12 and the container top 28 and also force the brake plate 62 into engagement with the slider plate lower surface 38B. This means that the seat base 12 is rotationally and positionally locked relative to the container top 28. In order to move the seat base 12 the spider plate 68 must be depressed.

The shaft 60 is internally threaded at 78 in the upper end and receives a bolt 80 having a nut 82 thereon. Bolt 80 provides means of adjusting the height of the shaft for purposes best seen in FIGS. 3 and 5 which illustrate mechanisms for actuating the actuator assembly to permit the aircraft seat to be positioned. As shown in FIG. 3, a bracket 84 is secured to the seat base 12. One end of an actuating lever 86 is pivotally supported to bracket 84. Also, supported on the top of the seat base 12 is a second bracket 88 which rotatably supports a pulley 90. A remotely located seat release lever 92 has one end connected to a pivot post 94 which in turn is affixed to some portion of the aircraft or seat convenient for the user. A cable 96 extends from the other end of the actuating lever 86 to the seat release lever 92. Cable guides 98 are mounted as necessary to guide the action of cable 96 so that when the seat release lever 92 is pivoted upwardly the cable 96 supplies a downward force on actuating lever 86 pushing the spider plate downwardly against the compression of springs 72 and 76. This downward movement of the spider plate and shaft 60 releases tension on the brake plate 62. With the tension released, the seat, including the seat base 12, may be moved forwardly or rearwardly or to the left or right. When moved forwardly or rearwardly the motion is accomplished by the movement of the slider plate 78 within the container 26. When moved to the left or the right the seat base plate 12, shaft 60, spider plate 68 and brake plates 20 are all moved laterally in the elongated opening 52 formed in the slider plate. The opening 50 in the container top is of sufficient size to permit the fore and aft and right to left movement of the seat. In addition, when the seat release lever 92 is pivoted upwardly the seat may be rotated as necessary. When force on the seat release lever 92 is removed, the springs urge shaft 60 and thereby brake plate 62 upwardly into non-slip engagement with the slider plate 38 and the top surface 38B of the slider plate into non-slip engagement with the lower surface 28B of the container top so that the seat is securely held in the selected position.

The seat release lever 92 has been described as being actuated by upward movement in conformance with the arrangement shown in FIG. 3. It can be seen that the lever 92 could be arranged to move the actuating lever 86 if pushed downwardly or back or forth depending upon the orientation of cable 96.

Figure 5:
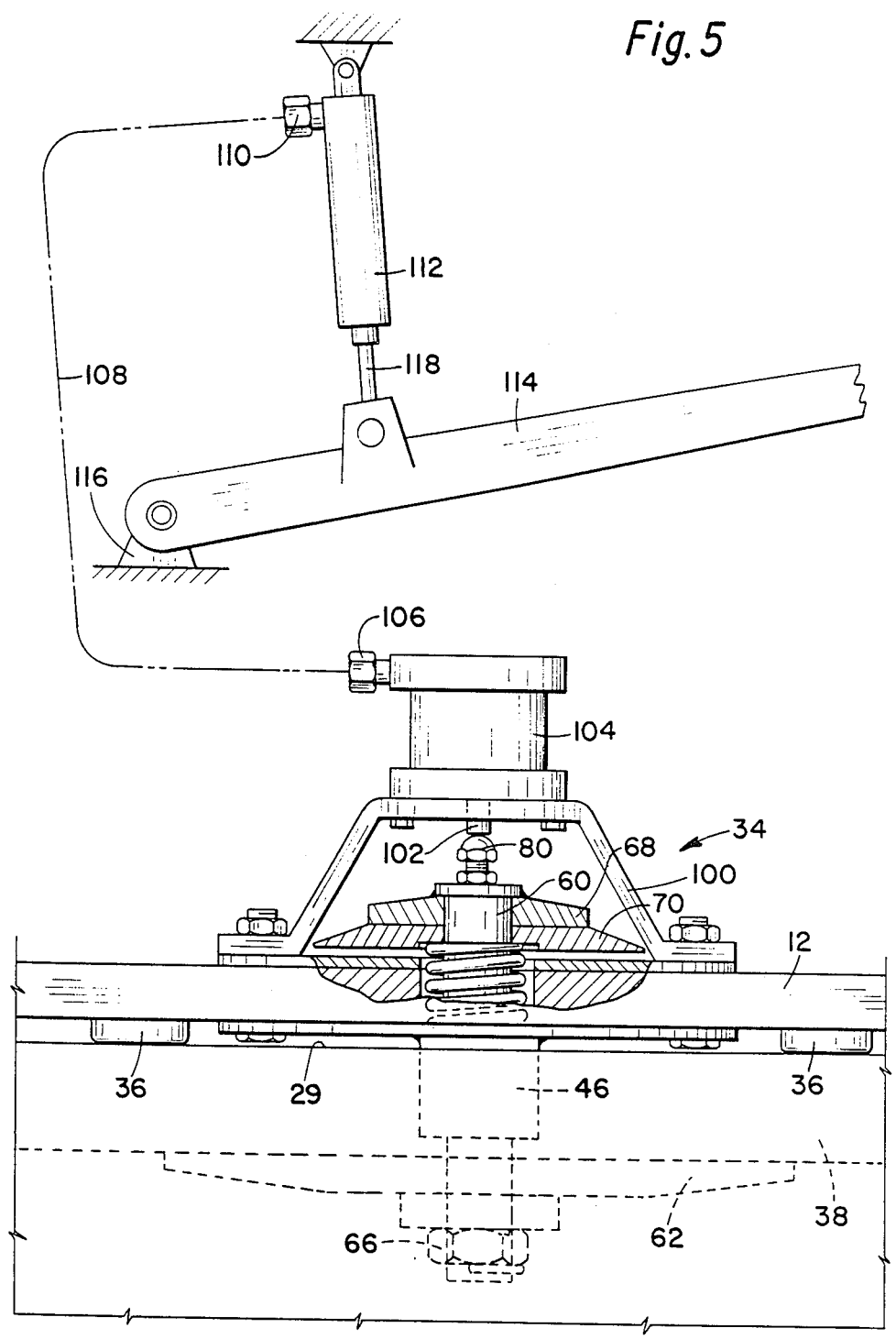
FIG. 5 is a partial vertical cross-sectional view of the major components of the seat adjustment mechanism and showing a hydraulic means for releasing the mechanism to allow adjustment of the seat.
Figure 6:
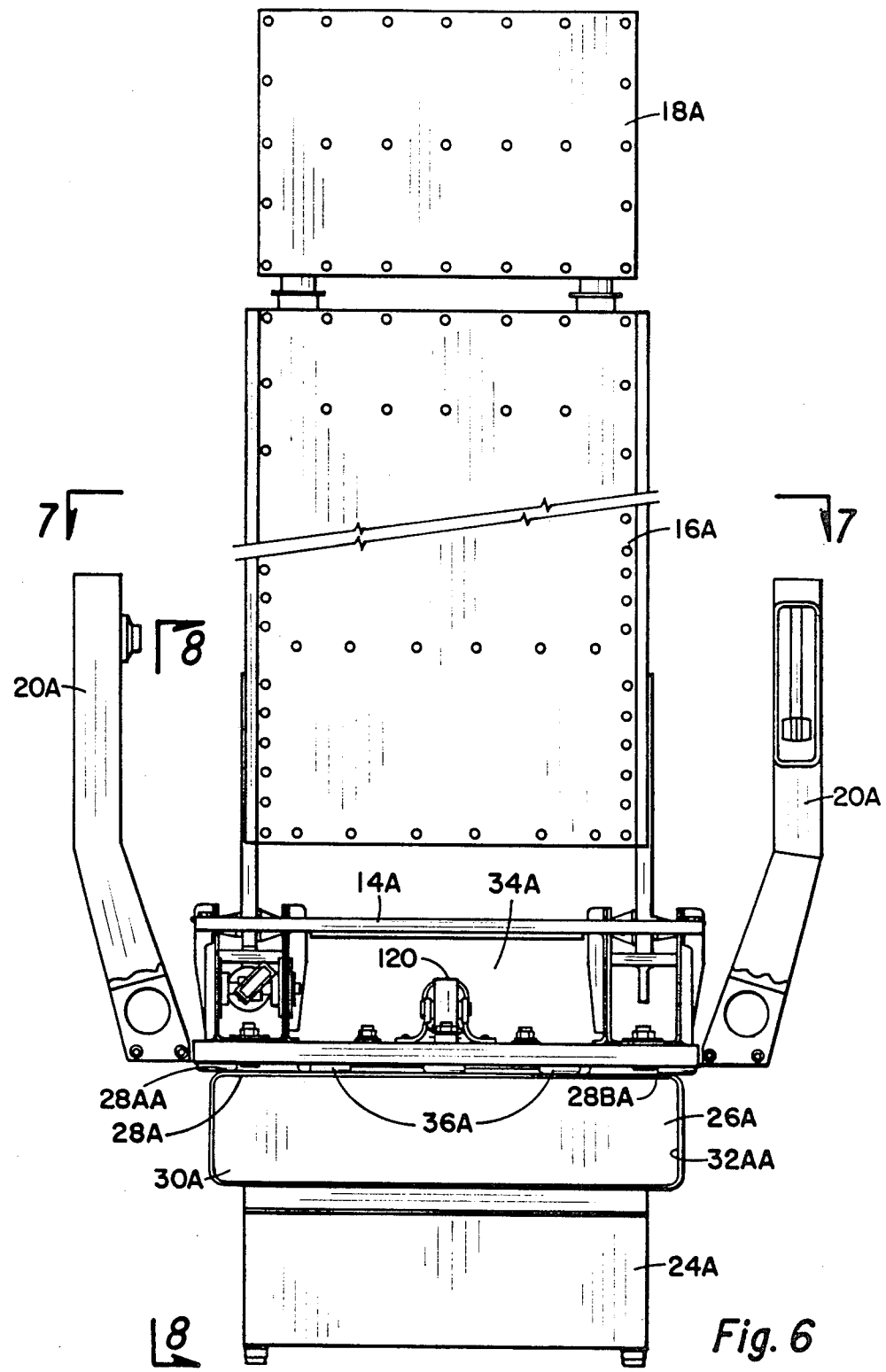
FIG. 6 is a front elevational view of an aircraft seat of this invention showing an alternate design of the means for controlling the position of the seat, the seat cushions not being shown.
Figure 8:
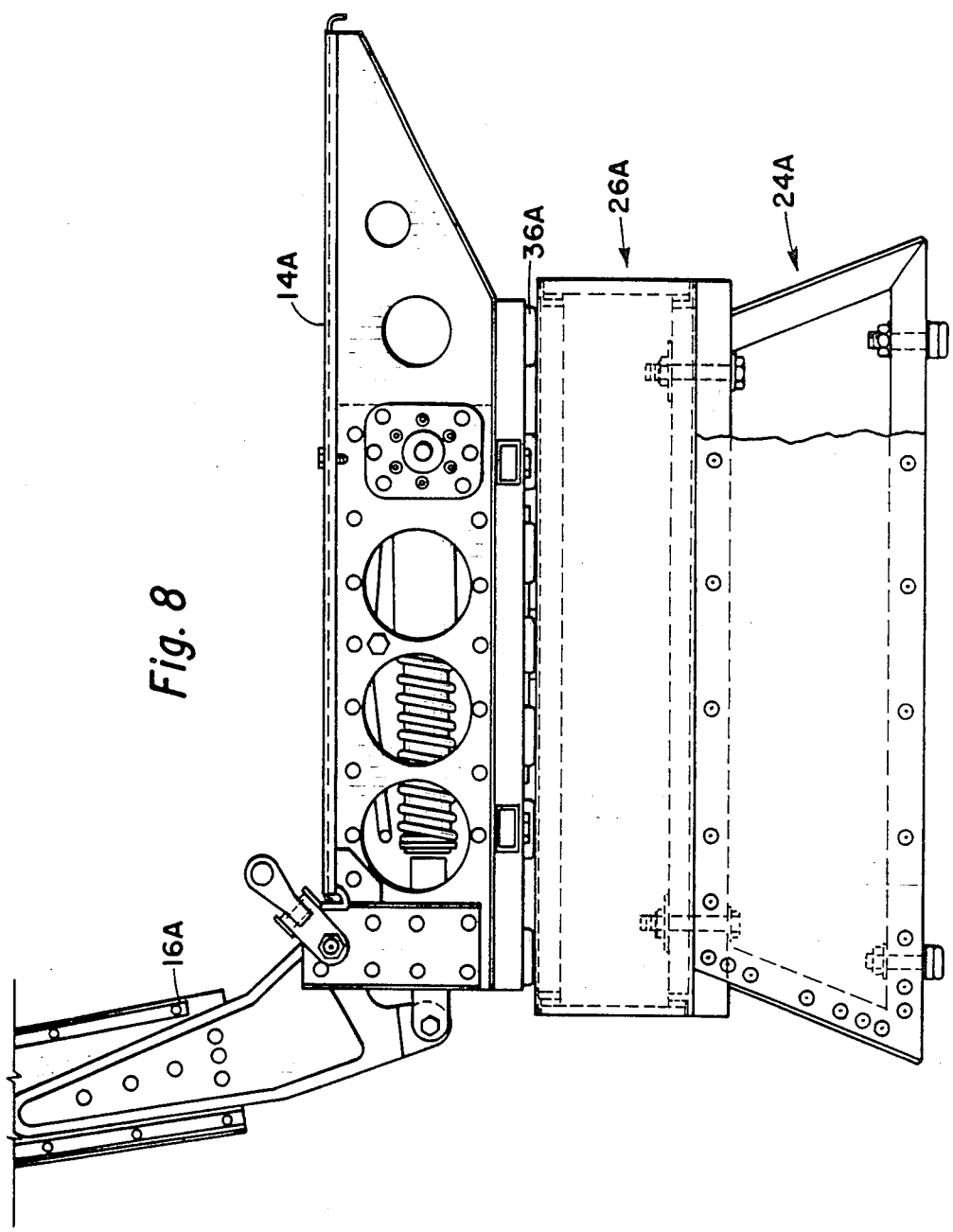
FIG. 8 is a partial elevational view taken along the line 8—8 of FIG. 6 showing additional details of the alternate seat embodiment.

FIG. 5 shows an alternate means of controlling the actuator assembly. A bracket 100 is mounted on top of the seat base 12, the bracket having an opening (not shown) receiving a piston rod 102 extending from a cylinder 104. The cylinder has a fluid outlet 106 which is connected by a hydraulic hose 108 to the fluid opening 110 of an actuating cylinder 112. A hydraulic actuating lever 114 is pivotally connected to a post 116 with the piston rod 118 extending from cylinder 112 being connected to the lever. The lever 112 is secured to a remote position in the aircraft which can also be on a part of the seat itself. When hydraulic actuating lever 114 is pivoted upwardly hydraulic fluid is forced from the actuating cylinder 112 via hose 108 to the cylinder 104, extending piston rod 102 to depress the spider plate and shaft 60 to thereby release the force applied by brake plate 62 in the same manner as previously described. FIGS. 3 and 5 are exemplary of the various means which may be employed to actuate the actuator assembly so that the seat may be easily moved or rotated as desired by the user.

While one embodiment of the invention has been described with reference to FIGS. 1 through 5, the preferred embodiment is illustrated in FIGS. 6 through 13. These figures show an alternate embodiment of the invention in which the aircraft seat basic structure remains essentially the same but wherein an improved design of the mechanism for controlling the position of the seat is provided. The embodiment of FIGS. 6 through 13 functions essentially in the same way as the embodiment of FIGS. 1 through 5, that is, to control the forward and rearward, lateral and rotational position of the seat. In both embodiments a brake plate is urged by spring tension against the top surface of the container. In the alternate embodiment of FIGS. 6 through 13, similar components are indicated by the same numbers as used in the embodiment of FIGS. 1 through 5 with the addition of the letter A.

Referring now to FIGS. 6 through 13, the improved actuating mechanism is best seen in FIGS. 10, 11, 12 and 13. Mounted on the top surface of the seat base 12A is an inverted V-shaped bracket 120 having opposed downwardly extending leg portions which are supported to the upper surface of seat base 12A by means of bolts 122 and nuts 124. An actuating lever 86A is pivoted about a pin 126 which extends through it and one leg of bracket 120. Secured to the bottom of the seat base 12A is a plate 128 having opening 130 therethrough, the plate supporting a downwardly extending bushing housing 132, a bushing 134 being retained within the housing. Received within bushing 134 and the opening 130 in plate 128 is a vertical shaft 136 which is threaded on its lower end at 138.

The upper end of shaft 136 has an enlarged diameter portion 140. By means of a pin 142 in the inner end of the actuating lever 86A is pivotally attached to the upper end of shaft 136.

Figure 9:
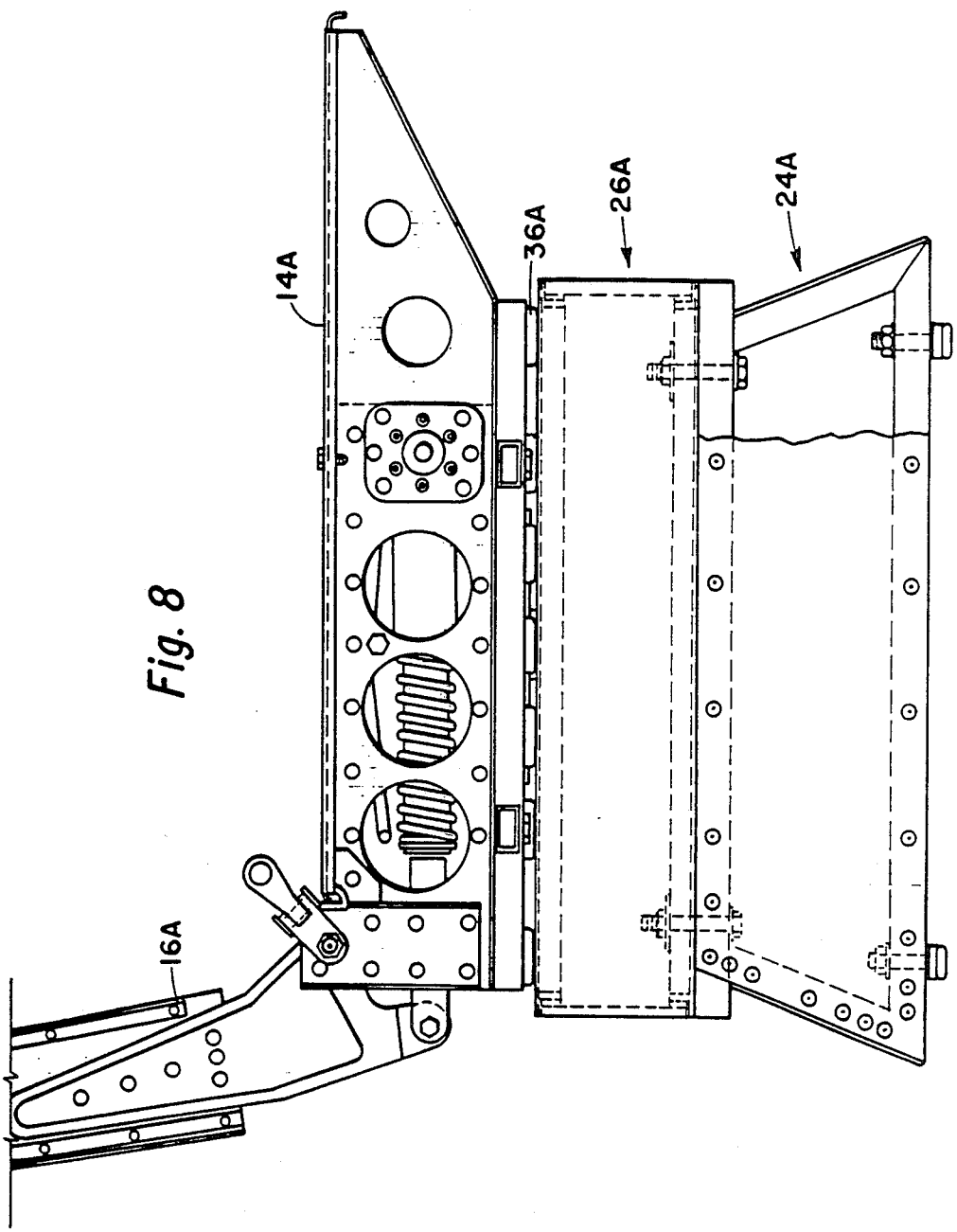
FIG. 9 is an elevational view of the seat control mechanism taken along the line 9—9 of FIG. 7.

Received on shaft 136 beneath the enlarged diameter portion 140 is a spacer support disc 144. Positioned between the spacer support disc and the upper surface of plate 128 is a spring in the form of a series of Belleville or cup shaped washers 146. The Belleville washer 146 forms a spring which urges shaft 136 in the upward direction and, therefore, unless force is applied by lever 86A to displace the shaft downwardly, the brake plate 82A secured to the bottom of the shaft, as shown in FIG. 9, and held in place by nuts 148, is upwardly urged to thereby retain the seat in position. When lever 86A is upwardly pivoted, the spring washers 146 are compressed, moving shaft 136 downwardly, and releasing pressure of the brake plate against the top of container 26A, allowing the seat to be moved fore and aft, laterally or to be rotated as selected by the occupant.

Secured to the seat base 12A at the outer end of actuating lever 86A is an inverted U-shaped guide member 150 which permits the outer end of lever 86A to move up and down relative to the seat base in a plane perpenducular to the seat base. In addition, the guide 150 secures the shield portion 152 of a cable 96A which extends to a remotely located seat release lever such as lever 92 in FIG. 3. When the seat release lever 92 is actuated, retracting cable 96A, the actuating lever 86A is pivoted upwardly at its outer end, pivoting the inner end downwardly and depressing shaft 136 against the compression of Belleville spring 146. This allows the seat to be adjusted fore and aft, laterally and rotationally. The embodiment illustrated in FIGS. 6 through 13 has the advantage of using fewer components compared to the embodiment of FIGS. 1 through 5. Specifically, relative to the first described embodiment, the embodiment of FIGS. 6 through 13 does not employ a spider plate and the five springs used to apply upward force on the spider plate. Instead, in the embodiment of FIGS. 6 through 13 the force is achieved by the use of a single stack of Belleville type spring washers 146, thus, substantially simplifying the construction while accomplishing the same purpose.

The invention thus provides a useful way of securely retaining a seat in a preselected position while nevertheless permitting fore and aft, right and left, or rotational movement of the seat.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An aircraft seat comprising:
    a container having a generally horizontal top with an upper and a lower surface and opposed paralleled, downwardly extending sides extending perpendicularly of said top;
    a seat base supported parallel to and above said container top upper surface;
    a plurality of low friction pads interposed between said container top surface and said seat base;
    a generally horizontal slider plate having an upper and a lower surface and being received within said container, the upper surface being contiguous to said container top lower surface, said seat base and said container top having aligned openings therethrough;
    a shaft received in said aligned openings;
    a brake plate received on said shaft below said slider plate and having an upper surface in engagement with said slider plate lower surface;
    a spring compressed between said seat base and said shaft urging said shaft upwardly and thereby said brake plate upwardly against said slider plate to lock said seat base relative to said slider plate and said container;
    means to compress said spring by downward force on said shaft to thereby relieve the frictional engagement of said brake plate against said slider plate to permit the movement of said slider plate and thereby said seat base relative to said container top; and
    an aircraft seat formed, in part, by said seat base.

2. An aircraft seat according to claim 1 wherein said slider plate has opposed paralleled edges adjacent to and spaced from said container sides, and including:
    rollers secured to said slider plate and rotatable about vertical axes, the rollers extending beyond said opposed edges of said slider plate and in engagement with said container sides.

3. An aircraft seat according to claim 2 wherein said slider plate has an elongated opening therein receiving said shaft, the length of the opening being transverse said container sidewalls engaged by said rollers whereby said seat base may be displaced forwardly and rearwardly as well as laterally relative to said container top.

4. An aircraft seat according to claim 1 wherein said means to compress said springs by downward force on said shaft includes:
    an actuating lever pivotally affixed at one end to the top of said seat base, the actuating lever extending over the top of said shaft whereby downward force on the other end of said actuating lever causes said shaft to be downwardly depressed.

5. An aircraft seat according to claim 4 including:
a pulley rotatably supported to said seat base adjacent said actuating lever other end;
a remotely located seat release lever pivotally supported at one end; and
a cable affixed at one end to said seat release lever at a point intermediate its ends, the cable extending around said pulley and affixed to said actuating lever other end whereby pivotation of said seat release lever transfers force by said cable to cause displacement of said actuating lever other end to downwardly depress said shaft.

6. An aircraft seat according to claim 1 wherein said means to compress said spring by applying a downward force on said shaft includes:
a bracket affixed to said seat base and extending above said shaft, the bracket having an opening therein coincident with the center of said shaft;
a hydraulic cylinder affixed to said bracket and having a piston rod extending therefrom, the piston rod being extendable to engage said slider plate, the hydraulic cylinder having a fluid opening therein;
a remotely located actuating cylinder having a piston rod extending therefrom and having a fluid opening therein;
a hydraulic actuating lever pivotally supported at one end and engaging said actuating cylinder piston rod; and
a hydraulic hose coupling said fluid opening of said actuating cylinder to said fluid opening of said hydraulic cylinder.

7. An aircraft seat according to claim 1 wherein said spring is in the form of a stack of Belview washers.

8. An aircraft seat comprising:
a container having a generally horizontal top with an upper and a lower surface and opposed paralleled, downwardly extending sides extending perpendicularly of said top;
a seat base supported parallel to and above said container top upper surface;
a generally horizontal slider plate having an upper and a lower surface, having opposed paralleled edges adjacent to and spaced from said container sides and being received within said container, the upper surface being continuous to said container top lower surface, said seat base and said container top having aligned openings therethrough;
rollers secured to said slider plate and rotatably about vertical axes, the rollers extending beyond said opposed edges of said slider plate and in engagement with said container sides;
a shaft received in said aligned openings;
a brake plate received on said shaft below said slider plate and having an upper surface in engagement with said slider plate lower surface;
a spring compressed between said seat base and said shaft urging said shaft upwardly and thereby said brake plate upwardly against said slider plate to lock said seat base relative to said slider plate and said container;
means to compress said spring by downward force on said shaft to thereby relieve the frictional engagement of said brake plate against said slider plate to permit the movement of said slider plate and thereby said seat base relative to said container top; and
an aircraft seat formed, in part, by said seat base.

9. An aircraft seat comprising:
a container having a generally horizontal top with an upper and a lower surface and opposed paralleled, downwardly extending sides extending perpendicularly of said top;
a seat base supported parallel to and above said container top upper surface;
a generally horizontal slider plate having an upper and a lower surface and being received within said container, the upper surface being continuous to said container top lower surface, said seat base and said container top having aligned openings therethrough;
a shaft received in said aligned openings;
a brake plate received on said shaft below said slider plate and having an upper surface in engagement with said slider plate lower surface;
a spring compressed between said seat base and said shaft urging said shaft upwardly and therby said brake plate upwardly against said slider plate to lock said seat base relative to said slider plate and said container;
an actuating lever pivotally affixed at one end to the top of said seat base, the actuating lever extending over the top of said shaft whereby downward force on the other end of said actuating lever causes said shaft to be downwardly depressed to compress said spring by downward force on said shaft to thereby relieve the frictional engagement of said brake plate against said slider plate to permit the movement of said slider plate and thereby said seat base relative to said container top; and
an aircraft seat formed, in part, by said seat base.

10. An aircraft seat according to claim 9 wherein said slider plate has opposed paralleled edges adjacent to and spaced from said container sides, and including:
rollers secured to said slider plate and rotatable about vertical axes, the rollers extending beyond said opposed edges of said slider plate and in engagement with said container sides.

11. An aircraft seat according to claim 10 wherein said slider plate has an elongated opening therein receiving said shaft, the length of the opening being transverse said container sidewalls engaged by said rollers whereby said seat base may be displaced forwardly and rearwardly as well as laterally relative to said container top.

12. An aircraft seat according to claim 9 including:
a pulley rotatably supported to said seat base adjacent said actuating lever other end;
a remotely located seat release lever pivotally supported at one end; and
a cable affixed at one end to said seat release lever at a point intermediate its ends, the cable extending around said pulley and affixed to said actuating lever other end whereby pivotation of said seat release lever transfers force by said cable to cause displacement of said actuating lever other end to downwardly depress said shaft.

13. An aircraft seat according to claim 9 wherein said means to compress said spring by applying a downward force on said shaft includes:
a bracket affixed to said seat base and extending above said shaft, the bracket having an opening therein coincident with the center of said shaft;

a hydraulic cylinder affixed to said bracket and having a piston rod extending therefrom the piston rod being extendable to engage said slider plate, the hydraulic cylinder having a fluid opening therein;

a remotely located actuating cylinder having a piston rod extending therefrom and having a fluid opening therein;

a hydraulic actuating lever pivotally supported at one end and engaging said actuating cylinder piston rod; and a hydraulic hose coupling said fluid opening of said actuating cylinder to said fluid opening of said hydraulic cylinder.

14. An aircraft seat according to claim 9 wherein said spring is in the form of a stack of Belview washers.

* * * * *